United States Patent [19]

Nicholson et al.

[11] Patent Number: 4,570,508

[45] Date of Patent: Feb. 18, 1986

[54] MULTI-STROKE PARKING BRAKE VARIABLE RATIO APPLY AND RELEASE MECHANISM

[75] Inventors: Michael A. Nicholson, Windsor, Canada; Thomas J. Kosmanski, Davison, Mich.

[73] Assignee: General Motors Corporation, Detroit, Mich.

[21] Appl. No.: 618,665

[22] Filed: Jun. 8, 1984

[51] Int. Cl.⁴ ............................ G05G 5/06; G05G 1/04
[52] U.S. Cl. ........................................ 74/535; 74/142; 74/517
[58] Field of Search ............... 74/534, 535, 536, 537, 74/539, 517, 142

[56] References Cited

U.S. PATENT DOCUMENTS

| | | | |
|---|---|---|---|
| 1,468,691 | 9/1923 | Anderson | 74/517 |
| 2,507,997 | 5/1950 | Roedding et al. | 74/537 |
| 4,311,060 | 1/1982 | Kawaguchi et al. | 74/142 |

FOREIGN PATENT DOCUMENTS 209449  12/1982  Japan ............................ 74/535

Primary Examiner—Robert L. Wolfe
Assistant Examiner—Vinh Luong
Attorney, Agent, or Firm—D. D. McGraw

[57] ABSTRACT

A parking brake actuating and release mechanism actuated through a series of strokes of the brake pedal lever to tension the parking brake cable throughout the desired range, the parking brake cable being connected with an eccentric cable take-up member so that the effective leverage applied to the cable causes the mechanical advantage to increase through at least the predominant range of actuation of the mechanism. A release mechanism provides quick release of the parking brake so that it returns to the released position.

1 Claim, 5 Drawing Figures

MULTI-STROKE PARKING BRAKE VARIABLE RATIO APPLY AND RELEASE MECHANISM

The invention relates to a mechanism for actuating a vehicle parking brake, and more particularly to one which is applied by a plurality of strokes of the pedal arm or lever while varying the effective ratio between the stroke of the lever and the parking brake cable travel to obtain an increased mechanical advantage as the tension is increased in the parking brake cable.

A multi-stroke parking brake mechanism embodying the invention provides appropriate in-car parking brake pedal location with respect to the vehicle operator, compensates for the minimum amount of foot lever travel capability due to the location of various interior body panels, and provides the cable travel and force required for adequate parking braking. It is particularly advantageous when the parking brake mechanism is incorporated in a vehicle disc brake caliper assembly, which usually requires more cable travel than does a drum brake parking brake mechanism.

The mechanism includes a foot operated lever that can be depressed several times to activate the parking brake system. Each time the lever is depressed and the foot pressure then reduced or removed, the lever returns to its original rest or released position so that the vehicle operator can easily stroke it again if desired. As the lever is depressed in the brake actuating direction an eccentric cable take-up member is rotated through a pawl mechanism and held in place by another pawl mechanism as the parking brake lever returns to the rest position. The ends of the parking brake system cable attach to the eccentric cable take-up member at or very near its maximum radius and to the parking brake mechanism at the vehicle wheel. As the eccentric is arcuately rotated, the cable is wrapped on it. The eccentric cable take-up member is carefully designed to impart a predetermined variable tension load on the cable as well as a predetermined cable travel for a set amount of arcuate eccentric take-up member movement. The predetermined cable force and travel are particularly important in meeting the required United States Government parking brake grade holding specifications while maintaining a maximum foot pedal parking brake applying force below a specified maximum value.

A parking brake release handle and lever linkage is incorporated into the mechanism so that the handle may be pulled to disengage the pawl normally preventing the eccentric cable take-up member from rotating in the brake release direction. When the pawl is so disengaged, the tension force in the parking brake cable causes the eccentric cable take-up member to rotate back to its original released position, thereby releasing the parking brake.

The eccentric cable take-up member, on which the cable wraps as brake actuation occurs, is provided with substantially constant bending radius to provide variable cable loads and cable travel, varying the mechanical advantage as the parking brake is actuated. The eccentric cable take-up member permits the take-up of a large portion of the cable which is necessary for parking brake function. The mechanism embodying the invention is side mounted to a vehicle body shear wall bracket by several fasteners for structural integrity.

Features illustrated in the drawing and discussed below which may or may not be incorporated in a mechanism of this type include the provision of a tab or other abutment on the fixed mounting bracket of the mechanism to limit the maximum amount of brake pedal travel. A guard may be provided at the upper portion of the mechanism to prevent body acoustical material and other matter from becoming intwined in any portion of the mechanism and interfering with its operation. A suitable electric switch may be activated as the brake lever is moved in the brake actuating direction to rotate the eccentric take-up member and control a parking brake indicator light on the instrument panel.

IN THE DRAWINGS

Figure 1:
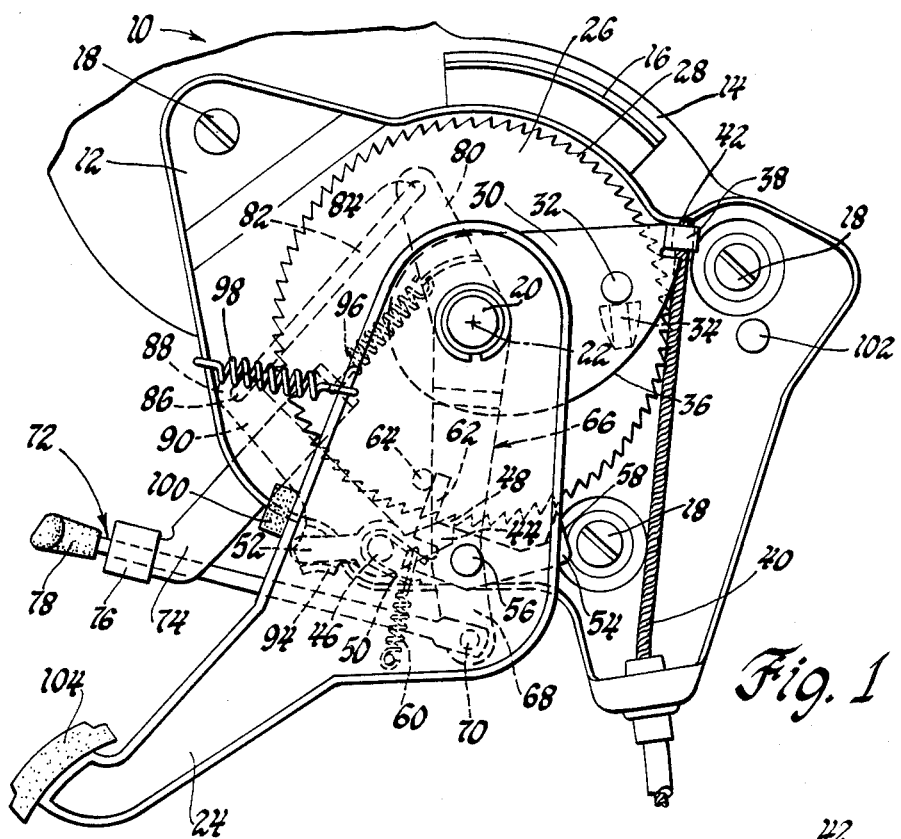
FIG. 1 is an elevation view, with portions shown in phantom lines, illustrating the parking brake control mechanism embodying the invention. The mechanism is illustrated in the fully released parking brake position.

The parking brake actuating and release mechanism 10 shown in the drawings include a fixed mounting bracket 12 fastened to a vehicle body shear wall bracket 14 in a suitable portion of the vehicle interior immediate available to the vehicle operator for parking brake actuation. This location is typically on the side wall of the lower portion of the passenger compartment adjacent the vehicle operator's lower legs. In lefthand drive vehicles, this is the left wall of that portion of the compartment. Since the mechanism is also mounted generally underneath the instrument panel, and other devices forming a part of the vehicle are positioned immediately above the mechanism, such devices including acoustical material, electrical wires, etc, it is desirable to include a guard 16 mounted on or formed as a part of mounting bracket 12 and so located that it will tend to keep such devices and material out of the mechanism embodying the invention. Mounting bracket 12 is illustrated as being securely attached to bracket 14 by fasteners 18. Three such fasteners are illustrated. An axle or pin 20 is secured to bracket 12 and has an axis 22 positioned substantially perpendicular to the general plane of bracket 12. The parking brake pedal lever 24 is pivotally mounted on pin 20 so as to be pivoted or moved arcuately about axis 22 from the rest position shown in FIG. 1 through a predetermined arcuate distance to the point of its maximum stroke, illustrated in FIG. 2. By way of example, this predetermined arc of movement of lever 24 may be about 65°. A toothed ratchet member 26, having teeth 28 on its outer periphery and illustrated as being a ratchet wheel, is also pivotally mounted on pin 20 to rotate arcuately about axis 22. The ratchet member 26 may be a sector rather than a complete wheel under some circumstances. It is arcuately rotatable through a maximum predetermined arc which is preferably more than twice as wide as the predetermined arc through which lever 24 may pivot. In the example illustrated in the drawings, the ratchet member 26 may pivot about axis 22 through approximately 155°.

Figure 2:
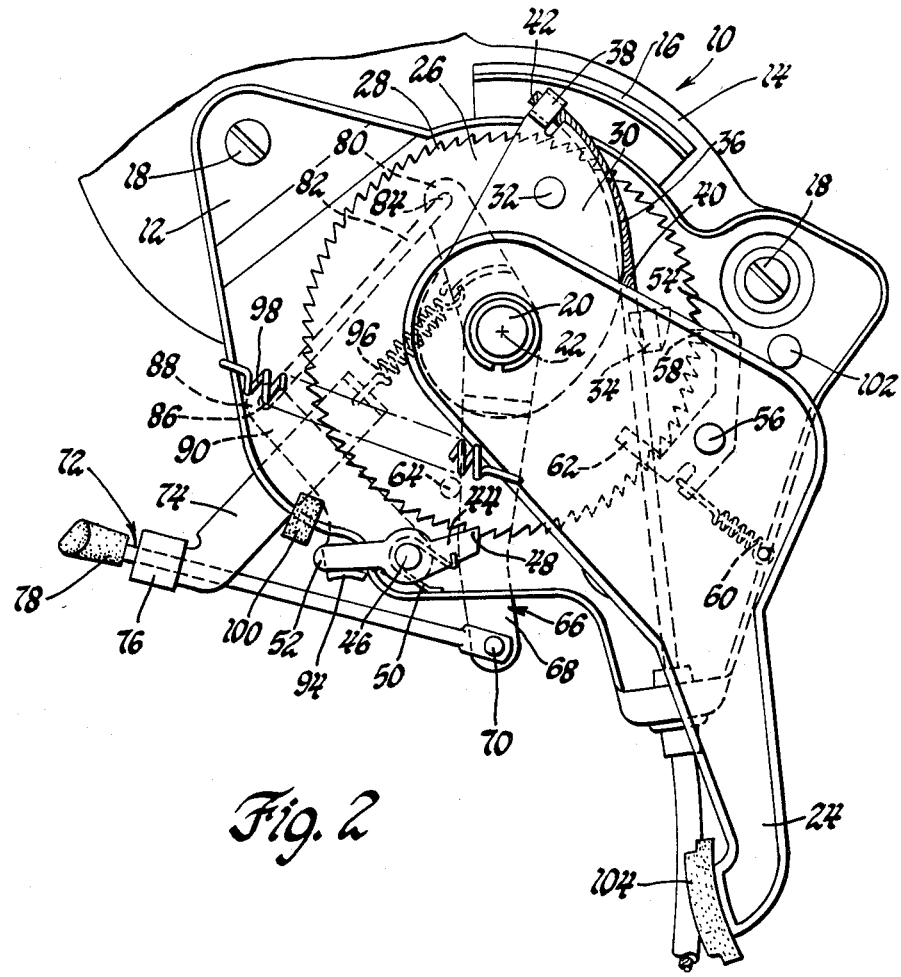
FIG. 2 is similar to FIG. 1 and shows the mechanism at the completion at the first brake apply stroke.
Figure 3:
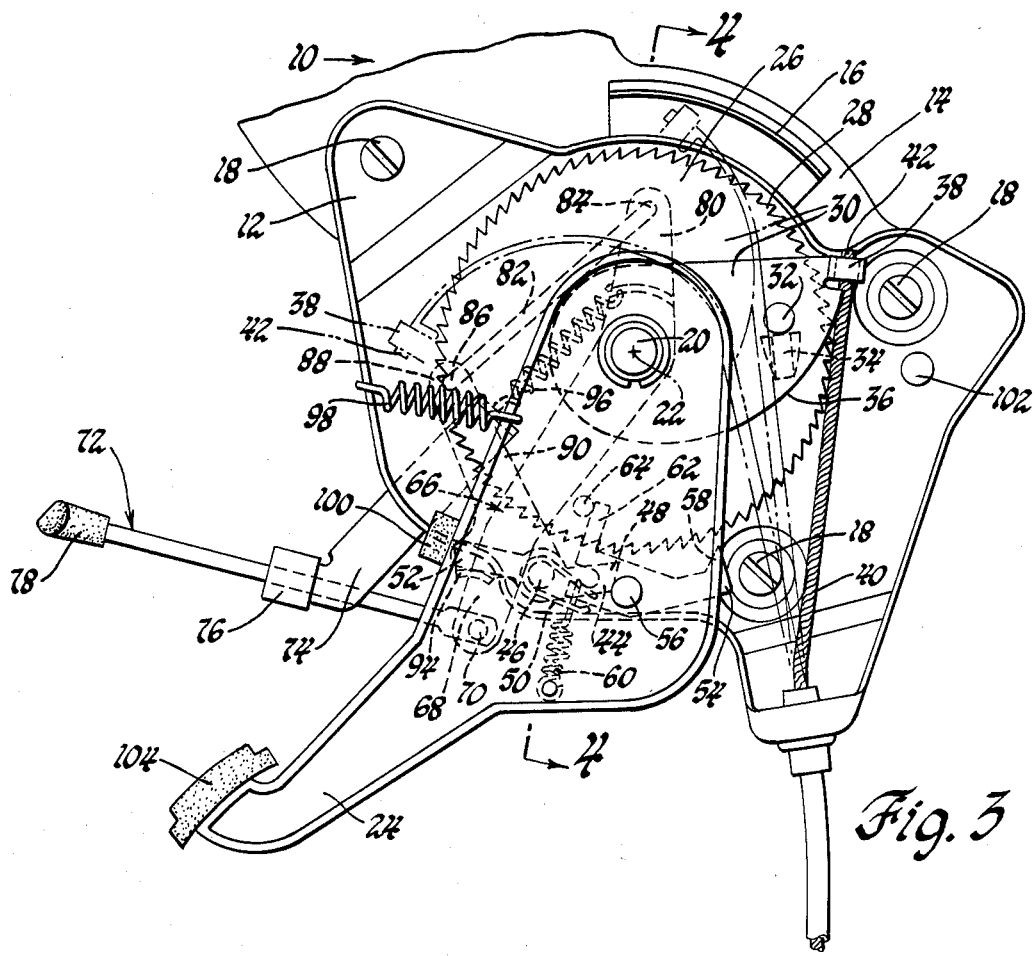
FIG. 3 is simlar to FIG. 1 and illustrates the mechanism when the parking brake has been fully applied and the pedal has been returned to its rest position.
Figure 4:
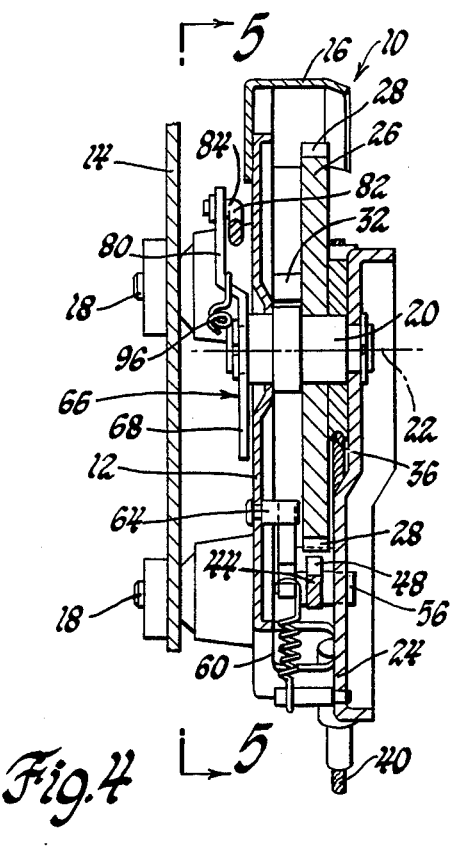
FIG. 4 is a cross-section view of the mechanism as illustrated in FIG. 3, with parts broken away.

An eccentric cable take-up member 30 is also pivotally mounted to arcuately rotate about axis 22 through the same maximum predetermined arc permitted the toothed ratchet member 26. In some arrangements the member 30 may be made substantially integral with the ratchet member 26. In the drawings however, member 30 is illustrated as being secured against relative rotation to member 26 by means of a pin 32 extending through the eccentric member and the ratchet member. Pin 32 may also extend beyond the ratchet member 26 so as to be adjacent the mounting bracket 12 and to be engageable with an abutment 34 formed as a part of, or secured to, mounting bracket 12. The engagement of pin 32 with abutment 34, illustrated in FIG. 1, will define the release position of the ratchet member 26 and the eccentric cable take-up member 30. Member 30 has a curved edge 36 of generally circular or otherwise curved form. This edge extends from the outer end 38 of the eccentric member 30 through an arc thereon which is at least as great as the maximum predetermined arc through which the eccentric member may pivot. The edge is preferably grooved in a pulley-like fashion, as shown in FIG. 4, or formed in some other suitable manner so that the parking brake cable 40 is guided so as to remain on the curved portion on the eccentric member as the parking brake mechanism is applied. Cable 40 has an end 42 which is attached to the eccentric member outer end 38 in a suitable manner to prevent it from becoming detached during operation of the mechanism. As can be seen in FIGS. 2 and 3, rotation of the eccentric member 30 in the brake applying direction, which is counterclockwise as viewed in these Figures, causes the portion of the parking brake cable 40 near the cable end 42 to be laid into the grooved edge 36, with its point of tangency coming closer to axis 22 as this rotation progresses. Thus the effective lever arm of eccentric member 30, measured from axis 22 to the cable point of tangency, decreases as the cable is tensioned.

A first pawl 44 is pivotally mounted by a pin 46 on a portion of the fixed mounting bracket 12 so that the pawl tooth 48 is movable into and out of engagement with the space between two of the teeth 28 of the ratchet member 26. A pawl spring 50 acts on pawl 44 and reacts against a portion of the fixed mounting bracket 12 to resiliently bias the pawl toward engagement with teeth 28. The other end of pawl 44 is formed to provide a pawl trip arm 52. This arm is used in the release of the mechanism as will be later described.

A second pawl 54 is pivotally mounted on the pedal lever 24 by means of pin 56. The tooth 58 of pawl 54 is selectively engageable and disengageable with the space between two of the adjacent teeth 28 of the ratchet member 26. The pawl is positioned so that when the tooth 58 is so engaged, the brake actuating movement of the pedal lever 24 will be transmitted through the pin 56 and the pawl 54 to force the toothed ratchet member 26 to rotate about axis 22. Pawl 44 will permit this action by ratcheting over the teeth 28 of member 26. A pawl spring 60 is attached to pawl 54 and a suitable portion of lever 24 so as to continually urge the pawl tooth 58 toward engagement with two adjacent ones of the teeth 28 of ratchet member 26. Pawl 54 is provided with a trip arm 62 which is engaged by the trip pin 64, mounted on a suitable part of mounting bracket 12, when the pedal lever 24 approaches its fully released position shown in FIG. 1. Trip arm 62 extends on the opposite side of the ratchet member 26 from the lever 24 in order to engage pin 64 at this time. It can be seen that as the lever 24 approaches its released position in its clockwise releasing movement, as seen in FIGS. 1, 2 and 3, it will reach a point where trip arm 62 will engage trip pin 64 and the pawl 54 will be forced to pivot about pin 56 to remove tooth 58 from the teeth of ratchet member 26, overcoming the biasing force of spring 60 in the process. Thus in the released position shown in FIG. 1, the tooth 58 of pawl 54 is disengaged from the teeth of ratchet member 26.

Figure 5:
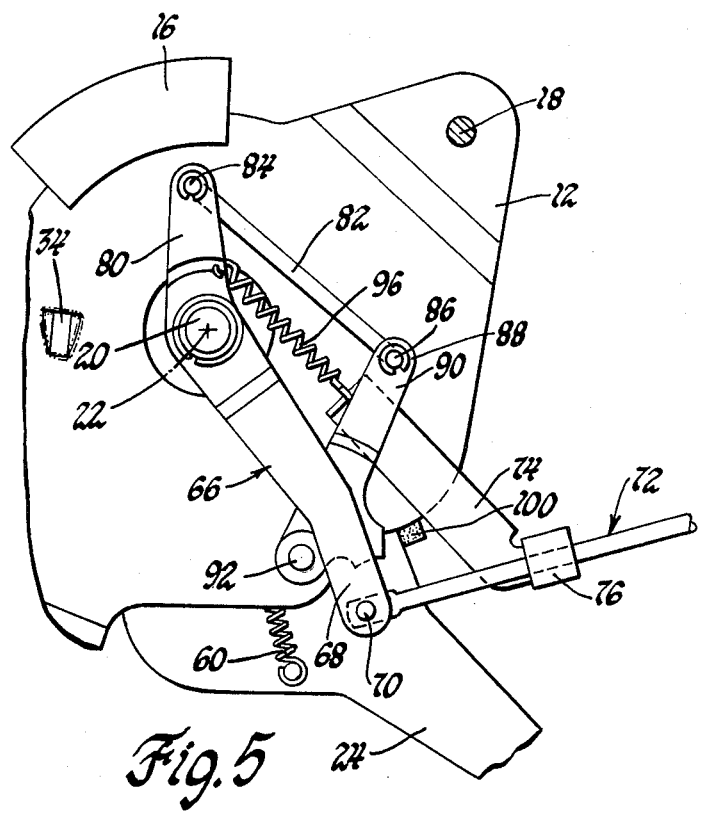
FIG. 5 is a fragmentary elevation view of portions of the mechanism taken in the direction of arrows 5—5 of FIG. 4.

The release mechanism shown in FIGS. 1, 2 and 3 is also shown in FIG. 5 in a view on the opposite side thereof from that in the other Figures. The release mechanism includes a link 66 which is pivoted on pin 20 to be moved about axis 22. Link 66 has generally oppositely extending arms. The link arm 68 has the release lever 72 pivotally attached to its outer end at 70. Release lever 72 extends through a guide arm 74, secured to and supported by fixed mounting bracket 12, and in turn supporting a suitable guide sleeve 76 through which the lever 72 extends. The outer end of the lever, projecting generally toward the vehicle operator, is illustrated as terminating in a T-shaped handle 78 which may be readily grasped by the operator and pulled when he desires to release the parking brake mechanism. The other link arm 80 of link 66 has a link 82 pivotally attached thereto at 84 and extending so as to be pivotally attached at 86 to one arm 88 of a trip lever 90. Trip lever 90 is pivotally mounted at 92 on the fixed mounting bracket 12 and has another arm 94 which is aligned so as to be in engagement with trip arm 52 of first pawl 44, as seen in FIG. 2. Pivot 92 on which trip lever 90 is pivoted may be, and preferably is, the first pawl pivot pin 46. A tension spring 96 is connected to link 66 and a suitable part of the fixed mounting bracket 12, here illustrated as a part of the guide arm 74 which is securely attached to the mounting bracket, so as to urge link 66 in the clockwise direction of FIG. 5, which is the counterclockwise direction of FIGS. 1, 2 and 3. This urges the release lever inwardly to its inactive position and the trip lever arm 94 in a direction so that it does not interfere with the pawl operation of first pawl 44. It can be seen, however, that when the vehicle operator pulls on the T-handle 78 and moves release lever 72 outwardly, which is leftwardly as seen in FIGS. 1, 2 and 3, he causes link 66 to pivot and transmit force through link 82 to pivot the trip lever 90, raising the trip lever arm 94, as seen in FIGS. 1, 2 and 3, to engage the pawl trip arm 52 and move the first pawl 44 against the force of its spring 50 to remove the pawl tooth 48 from the toothed ratchet member 26, thus releasing that ratchet member. If this is done while the brake is applied, the brake actuating tension force in the parking brake cable 40 will cause the toothed ratchet member 26 to rotate clockwise as seen in FIGS. 1, 2 and 3, together with the eccentric cable take-up member 30, permitting the cable end 42 of cable 40 to move back to the parking brake release position illustrated in FIG. 1 from its applied position, which is one of the positions illustrated in phantom in FIG. 3. If the release lever should be pulled by the vehicle operator while he is holding the brake pedal lever 24 in the applied position illustrated in FIG. 2, the tension in the parking brake cable will also act through pawl 54 by way eccentric cable take-up member 30 and ratchet member 26 to urge the pedal arm from that position back to the released position shown in FIG. 1. As it approaches the released position, pin 64 will be engaged by trip arm 62, releasing pawl 54 from the ratchet member 26 and permitting the ratchet member as well as the eccentric take-up member 30 and the parking brake cable 40 to continue to move to the fully released condition of operation.

A tension spring 98 may also be provided to act on the pedal lever 24 and the fixed mounting bracket 12 to continually urge the pedal lever 24 toward the released position shown in FIG. 1. A suitable resilient bumper 100 is illustrated as being provided on mounting bracket 12 to define the fully released position of lever 24. A suitable abutment 102 may be provided on mounting bracket 12 to be engaged by an edge of the parking brake lever 24 to define its maximum applied position.

In normal vehicle operation the parking brake mechanism is in the fully released position shown in FIG. 1. Whe the vehicle operator decides to apply the parking brake, he exerts a suitable force on the pedal 104 on the parking brake pedal lever 24 to move that lever arcuately about axis 22. He may move it through the predetermined maximum arc set forth by the position of the bumper 100 and abutment 102, if desired. As noted above, this arc is illustrated in the drawing as being approximately 65°. In doing so, pawl 44 will ratchet over teeth 28 while pawl 54, being in engagement with those teeth, will drive ratchet member 26 and therefore eccentric cable take-up member 30 counterclockwise as seen in FIGS. 1, 2 and 3, applying tension to the parking brake cable 40. When the first stroke of lever 24 has been completed, as illustrated in FIG. 2, the ratchet member 26 and the eccentric cable take-up member 30 will be rotated through a similar arc of about 65° from the release position. Since the vehicle operator is instructed to pump the pedal 104 for one or more strokes until the desired parking brake force is achieved, he will release the pedal 104, allowing the lever 24 to rotate clockwise from its position in FIG. 2 so that it returns to the position in FIG. 1. This is permitted by tooth 58 of pawl 54 ratcheting over teeth 28 of ratchet member 26 while pawl 44 holds the ratchet member 26 against any releasing movement. The vehicle operator again applies force to the brake pedal 104 for a second stroke, and may again move it through the maximum arc if he so desires. This will move the ratchet member 26 and the eccentric cable take-up member 30 through an additional arc equal to the arc of movement of the pedal lever, which may be as much as 65° as noted above. He will then remove the force from the brake pedal and it will again return to the position shown in FIG. 1. However, the cable end 42 will have moved further counterclockwise from the position shown in FIG. 2, with additional tension having been applied to parking brake cable 40. At the same time the parking brake cable is being laid in groove 36 of the eccentric cable take-up member 30 and, because of the shape of the eccentric, the effective lever arm of the eccentric is decreased from axis 22 to the point of tangency of the cable, increasing the mechanical advantage as the eccentric cable take-up member has been moved in the actuating direction. This is particularly well illustrated in FIG. 3, showing the various steps involved. If the vehicle operator desires to further tension the parking brake cable 40, he may again stroke the lever 24, rotating the toothed ratchet member 26 and the eccentric cable take-up member 30 even further counterclockwise. For example, the cable end 42 may be moved to the fully applied position illustrated in FIG. 3, and the brake pedal lever may be released to its return rest position, also shown in FIG. 3.

When the vehicle operator desires to release the parking brake he merely pulls on the handle 78 to move the release lever 72, actuating the trip lever 90 so that its arm 94 engages pawl trip arm 52 of pawl 44 and removes the pawl tooth 48 from the teeth 28 of ratchet member 26. Since the trip arm 62 of pawl 54 is already in engagement with trip pin 64, holding the pawl tooth 58 of pawl 54 out of engagement with the teeth of ratchet member 26, the ratchet member and the eccentric cable take-up member may rotate toward the released position, under influence of the tension in the parking brake cable 40, until the parking brake is fully released. The vehicle operator may release the lever 72, and tooth 48 of pawl 44 will once again engage the toothed ratchet member 26 and be in condition to again hold tension in the parking brake cable when the mechanism is again actuated.

In one embodiment it has been found that the shape of the curve of the edge 36 of the eccentric cable take-up member is desirably such that the mechanical advantage or ratio between cable travel and pedal stroke will increase from approximately 3:1 at the beginning brake actuation to approximately 4.2:1 at the end of the first stroke, and continuing from 4.2:1 at the beginning of the second stroke to approximately 6:1 at the end of the second stroke. During the third stroke it may increase from approximately 6:1 to about 7:1 maximum. It may be so shaped that before completion of the third stroke the ratio may decrease slightly, for example to about 6:1 if desired. It has been found that with a vehicle having a weight of approximately 2050 kilograms and incorporating the parking brake in disc brake calipers, the desired maximum cable travel capability of about 125 millimeters may be approached through three strokes. The first stroke, for example, may move the cable about 54 millimeters, the second stroke may move the cable an additional amount for a total of about 89.5 millimeters, and the third stroke may move the cable for an additional amount to about 117.5 millimeters. All of this may be accomplished within the maximum requirements permitted for the amount of brake pedal force to be applied to fully apply the parking brake mechanism to hold on the appropriate road grade. In a typical installation it has been found that the mechanism will supply sufficient parking brake force to hold such a vehicle on a 20 percent grade by applying the mechanism through two such strokes. It will hold on a 30 percent grade by applying the mechanism through a portion of the third stroke, before the maximum mechanical advantage has been obtained.

The embodiments of the invention in which an exclusive property of privilege is claimed are defined as follows:

1. A parking brake actuation and release mechanism comprising:
   a fixed mounting bracket;
   a parking brake lever pivotally mounted on said mounting bracket to pivot arcuately about a pivot axis through a first maximum predetermined arc between a rest position and an applied position;
   a toothed ratchet member pivotally mounted on said mounting bracket to pivot arcuately about the pivot axis through a second maximum predetermined arc which is more than twice as wide as said first arc;
   an eccentic cable take-up member pivotally mounted on said mounting bracket to pivot arcuately about the pivot axis through said second maximum predetermined arc and having
      drive means between said toothed ratchet member and said eccentric cable take-up member to drive said eccentric cable take-up member by said toothed ratchet member arcuately in the brake applying direction;

a first releasable pawl pivotally mounted on said mounting bracket and selectively normally engaging said toothed ratchet member to prevent brake releasing movement thereof;

means for selectively releasing said first pawl to disengage it from said toothed ratchet member;

a second releasable pawl pivotally mounted on said parking brake lever and normally engaging said toothed ratchet member to drive said toothed ratchet member and said eccentric cable take-up member in the arcuate brake actuating direction with the brake actuating strokes of said parking brake lever from its rest position and to ratchet over said toothed ratchet member as said parking brake lever returns to the rest position while said first pawl is in toothed engagement with said toothed ratchet member and preventing brake releasing movement thereof;

a parking brake cable having one end secured to said eccentric cable take-up member at a maximum effective radius from the pivot axis, said cable being received by said eccentric with a decreasing effective radius from the pivot axis as said eccentric take-up member is arcuately driven in the brake actuating direction to continually increase the mechanical advantage of the cable travel relative to pedal lever movement as the mechanism applies the parking brake by tensioning the cable;

said first and second pawls cooperating with said toothed ratchet member to permit multiple parking brake lever strokes from the rest position within said first arc to drive said toothed ratchet member and said eccentric cable take-up member through said second arc to exert a maximum parking brake take-up and apply force through said cable;

said first pawl when released allowing the brake actuating tension force in said cable to return said toothed ratchet member and said eccentric cable take-up member to the brake released position;

and trip means on said fixed mounting bracket engaging said second pawl as said pedal lever is returned to the rest position to hold said second pawl out of engagement with said toothed ratchet member while said pedal lever is at the rest position, said second pawl being moved during initial brake actuating movement of said pedal lever to be disengaged from said trip means and to engage said toothed ratchet member in driving relation.

* * * * *